Aug. 16, 1960 T. G. CUSTIN ET AL 2,949,584
AUTOMATIC FREQUENCY CONTROL CIRCUIT
Filed Nov. 20, 1957

INVENTORS:
THOMAS G. CUSTIN,
JACK SMITH,
BY Joseph P. Kates
THEIR ATTORNEY.

United States Patent Office 2,949,584
Patented Aug. 16, 1960

2,949,584

AUTOMATIC FREQUENCY CONTROL CIRCUIT

Thomas G. Custin, Baldwinsville, and Jack Smith, North Syracuse, N.Y., assignors to General Electric Company, a corporation of New York Filed Nov. 20, 1957, Ser. No. 697,664

18 Claims. (Cl. 332—19)

The present invention relates to an automatic frequency control circuit and more particularly relates to an automatic frequency control circuit suitable for use in a transmitter such as a visual transmitter of the type adaptable to microwave television station and relay equipment.

Prior art automatic frequency control devices for such use such as straight D.-C. amplifiers had disadvantages of insufficient stability and of being very adversely affected by variations in tube and components characteristics.

The apparatus of the present invention overcomes these and other deficiencies of prior art devices and in addition simultaneously combines with overall electromagnetic wave generating equipment to provide D.-C. voltage for a klystron repeller, to provide for monitoring output signals of the equipment (transmitter) and in addition to direct monitoring also automatically provides an approximately sawtooth test signal or triangular or buttress wave which, when observed on the monitor output, permits visual monitoring of certain performance characteristics of the transmitter or other equipment in which the invention is utilized.

The present invention involves a multifunctional and novel method, means, and apparatus for automatic frequency control especially adaptable to apparatus including klystron oscillators in which a first function of supplying the repeller voltage for the klystron is accomplished by generating an A.-C. voltage, controlling the amplitude of the A.-C. voltage by a D.-C. error voltage derived from a frequency monitoring circuit, the D.-C. error voltage being determined by comparison with a predetermined reference frequency, amplifying an A.-C. voltage, the amplitude of which has been controlled by the D.-C. error voltage, rectifying this last-mentioned A.-C. voltage and using the rectified voltage to supply the repeller voltage for the klystron.

In accordance with the present invention there is also provided a means for measuring and calibrating the degree of frequency modulation for a transmitter. From the inventive AFC circuit is generated a test sawtooth voltage which may be fed into a video amplifier to frequency modulate a klystron such that an output discriminator can display this modulation to enable taking a calibration of the modulation provided by the sawtooth. This sawtooth in turn can be compared to an input video signal to describe the amount of frequency deviation. This amount of modulation can be measured by means of an absorption type wavemeter coupled to the discriminator circuit, the wavemeter coupling a small amount of energy from the discriminator at its resonant frequency to form a wave trap. The resultant effect of the wave trap is to produce a notch in the sawtooth waveform as displayed on the output of a video monitor. The wavemeter marker is directly calibrated in frequency and thus by adjusting the wavemeter to a selected position on the sawtooth a particular position on the sawtooth may be calibrated to the indicator wavemeter frequency. After the amplitude of a sawtooth has been established to correspond to a given frequency deviation, the transmitted video signal may be adjusted to provide the same amplitude as viewed on the monitor as the previously established limits by the sawtooth test signal to thus provide an indication of output modulation because the spread between the notches can provide reference points on the sawtooth which correspond to a permitted band of frequency swing within which it is desired to modulate the transmitted carrier wave.

Accordingly, an object of the present invention is to provide a stable circuit, affected only to a minimum degree if at all by variations in component characteristics, for supplying desired repeller voltage to a klystron.

Another aim of the present invention is to provide an automatic frequency control (AFC) circuit controllable by error voltage in accordance with deviation in actual frequency from desired frequency of a transmitter such that rapid and very sensitive response to off-frequency deviation will be effected to thereby permit the repeller voltage of a klystron or other frequency determining voltage of an electromagnetic wave generator to be accordingly varied in order to resume an on-frequency condition quickly and accurately.

Another purpose of the present invention is to provide an automatic control system capable of rapid and very sensitive response to off-frequency condition and which will provide concurrent functions of generating a reference test signal, generating a visual monitor signal and simultaneously supplying actual klystron power.

Another object of the invention is to provide an automatic frequency control circuit capable of responding in a rapid and sensitive manner to deviation from desired output frequency and which will incorporate a relatively small number of components and perform additional functions of providing testing for modulation of carrier frequency and which will be relatively stabile in operation and will indicate modulation linearity.

Another purpose of the present invention is to provide a device for sensitive automatic frequency control which will generate a stabile pulse at fixed time intervals and will effect rapid and accurate changes in repeller voltage in response to the error in frequency of a transmitter by presenting a sensitive control of the output waveform of the stabile signal generating means.

Another object of the invention is to provide television apparatus incorporating a method and apparatus for keeping on-carrier frequency condition and also regulating modulation within closely held tolerances and providing continuous indicator presentation of modulation characteristics as well as for calibration for initial desired modulation characteristics for such continuous observance.

The features of the invention which are believed to be novel are set forth with particularity in the appended claims. The invention itself, however, both as to its organization and method of operation, together with further objects and advantages thereof, may best be understood by reference to the following description when taken in connection with the drawings, wherein:

Figure 1:
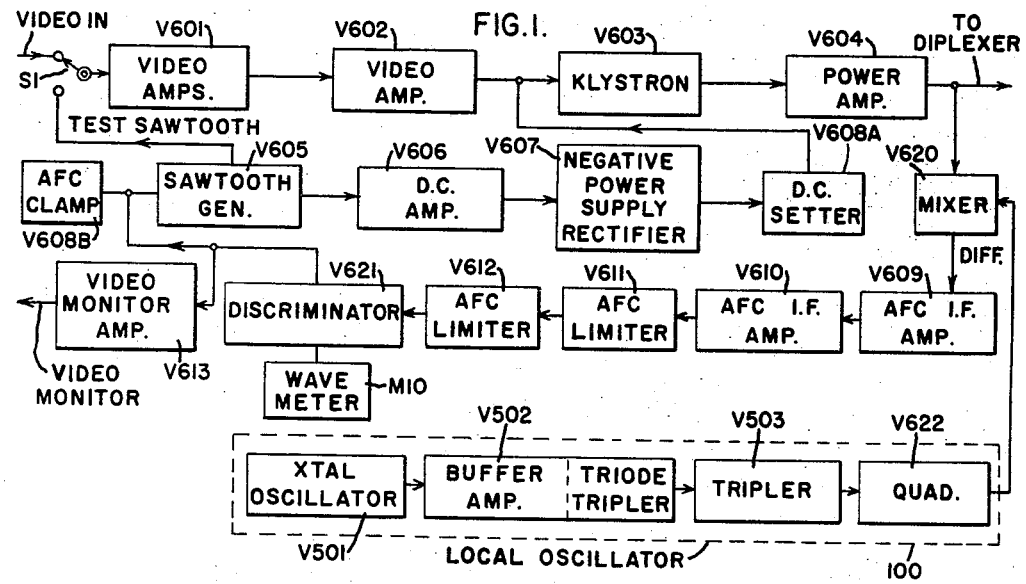
Figure 1 is a block diagram of a visual transmitter incorporating the features of the present invention.

Referring now to the figures of the drawings provided by way of illustration of the automatic frequency control system of the present invention and in particular to the transmitter of Figure 1, an input video signal may be applied to the input of a video amplifier consisting of video amplifier stages V601 and V602 wherein is produced an output raised to a sufficient potential to be applied to a klystron repeller V603 to produce a frequency modulated carrier output. The klystron V603 serves as a carrier wave generating device whose frequency is determined by an accompanying cavity circuit together with the potential applied to its control or repeller element. The output of the klystron V603 may be amplified by power amplifier V604 which also serves as an isolating device or buffer between the self-excited klystron oscillator and the antenna load. While the major portion of the power from power amplifier V604 is fed to the antenna, a small sample may be coupled to a mixer V620. A second source of power to provide an IF frequency difference from the RF carrier frequency is supplied by the local oscillator 100. The local oscillator 100 may consist of a reference crystal oscillator V501, frequency multipliers V502 and V503 and further multiplication may be provided in a diode quadrupler V622 to provide a local oscillator frequency which in turn may be fed to the input of mixer V620. The output of mixer V620 which constitutes the frequency difference between the carrier frequency and the local oscillator frequency may be fed to IF amplifier stages V609 and V610, and thence to limiter stages V611 and V612 which may provide an amplified IF voltage free of amplitude modulation to a discriminator V621. The discriminator V621 may generate an error voltage which is used as the control voltage of the AFC circuit of the invention as will be described in greater particularity hereinafter. As previously stated the potential applied to the repeller of the klystron V603 in addition to supplying necessary potential for the operation of the tube also serves as a frequency controlling voltage. Since it is necessary that the klystron output be controlled on frequency, if this applied voltage is adjusted in accordance with the requirements of the frequency controlling device, then the output of the klystron V603 and hence the transmitter will be maintained on the desired operating frequency. Accordingly, the AFC circuit provides, first, a means of providing the D.-C. potential for klystron V603 and, secondly, means for varying this potential in accordance with the requirements of an error voltage generated as the frequency difference between the klystron RF output and a control or reference oscillator as measured in terms of the discriminator comparator circuit V621.

To further clarify the operation of the discriminator and associated IF circuitry to produce an error voltage, let us assume for purposes of illustration the following example: If a carrier frequency at 2000 megacycles is fed to the mixer V620 and the local oscillator frequency is 2020 megacycles an IF digerence frequency of 20 megacycles would be produced. If the discriminator V621 is adjusted so as to provide zero output voltage for this desired 20 megacycles IF frequency, then deviation from the 20 megacycles caused by a frequency difference of the reference klystron V603 will produce a discriminator error voltage which in turn will be plus or minus depending on whether the klystron frequency were higher or lower than the desired frequency as compared to the local oscillator. Since the error output of the discriminator serves to determine if the klystron frequency is to be raised or lowered, this error voltage when properly amplified can close the servo loop around klystron V603 so as to provide the necessary voltage difference. The error voltage will change the klystron frequency in the direction which will tend to reduce the discriminator output error voltage until a point is reached where the servo loop has stabilized and virtually exact output frequency is delivered. The operation of the automatic frequency control system of the invention is responsive to the error signal generated by the discriminator as follows:

The sawtooth generator V605 comprises a first blocking oscillator circuit capable of generating sharp pulses at a frequency of about 15 kilocycles, for example, and these pulses may be applied to a cathode follower comprising one half of electron discharge device V606. This results in a reverse sawtooth waveform being produced which in turn may be applied to the other half of stage V606 where it is amplified. The second half of the sawtooth generator that is, V605B operates to provide the sawtooth voltage by discharge of a capacitor in an RC circuit. The amplitude of this sawtooth is controlled by the D.-C. error voltage from the discriminator V621 and is applied to the control grid of the second half V605B of the sawtooth generator circuit V605. The output of the amplifier V606 is rectified by diode V607 to provide the klystron D.-C. repeller voltage. An additional diode circuit V608A serves as a D.-C. restorer in order that the applied video voltage will be clamped at a peak of the synchronizing waveform of the television signal. Thus, the output of the D.-C. setter V608A clamps the repeller voltage so as always to swing from one direction and thus the output frequency is modulated in accordance with the applied potential so as to deviate only in one direction from this clamping point. The AFC clamp V608B may be provided if desired or its function may be performed by means of pre-emphasis of the incoming video signal.

Figure 3:
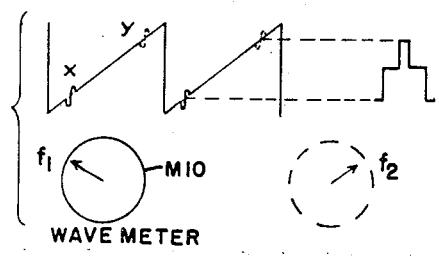
Figure 3 is a diagrammatic representation to present pictorial explanation of the inventive method and apparatus for modulation fixing utilizing the apparatus of Figures 1 and 2.

Concurrently the output of discriminator V621 may be amplified by a video amplifier V613 and transformed to a low output impedance to provide a source of video monitoring of the transmitted signal. Since the output of the transmitter is essentially demodulated by discriminator V621, video amplifier V613 in turn will reproduce the modulation supplied to the transmitter and while the D.-C. component of the discriminator V621 is used to provide the error voltage to obtain frequency correction, the A.-C. component or the modulating voltage is recovered from the video monitor amplifier V613 to provide the operator with means for determining the modulation characteristics of the transmitter. In addition, a wavemeter applied to discriminator V621 may be used to provide a mark on the observed output of the video monitor amplifier V613. This is best illustrated in Figure 3 wherein an applied sawtooth waveform is shown as used on a visual indicator such as in an oscilloscope which in turn shows a wave trap mark as a discontinuity in the sawtooth waveform. The sawtooth to be used for this test signal is simultaneously obtained from the sawtooth generator V605 which supplies a test signal to be fed into the video amplifier V601 when the input selector switch S1 is in the test position. When the video input switch S1 is restored to normal or video in position, the test sawtooth is disconnected and the carrier modulation is supplied directly by the incoming video signal.

Figure 2:
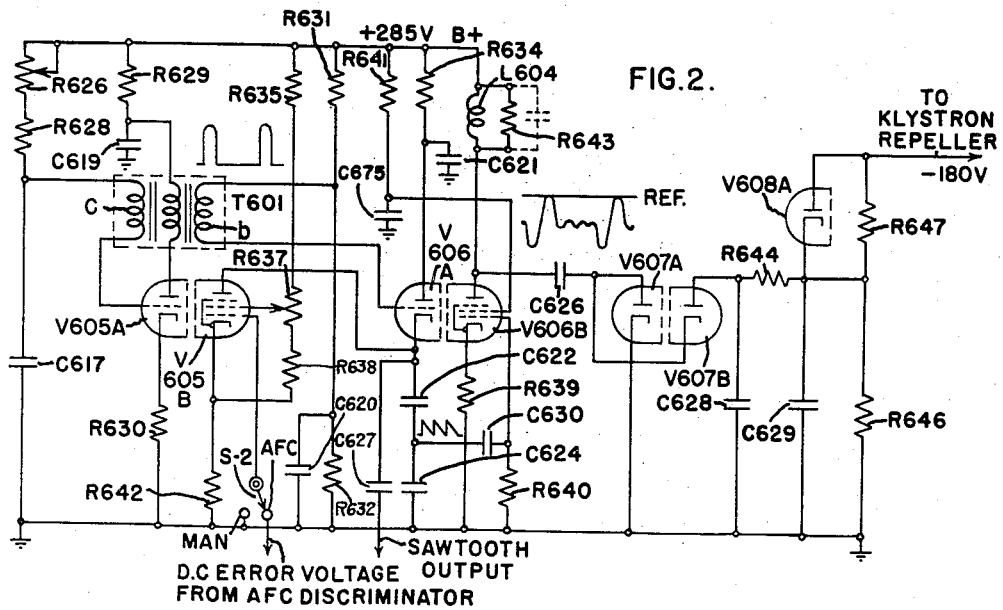
Figure 2 is a schematic representation of a preferred embodiment of the automatic frequency control apparatus of the present invention.

Referring more particularly to the automatic frequency control circuit of Figure 2, a blocking oscillator V605A is utilized to generate a series of sharp pulses at a frequency, for example, of 15 kilocycles. The blocking oscillator frequency is derived from the regenerative amplifier circuit consisting of transformer T601 with an RC time constant device in the grid circuit comprising discharge capacitor C617 and charging resistors R626 and R628 the former of which may be adjusted to provide the desired blocking rate for the oscillator.

Blocking oscillator V605A may have a cathode current limiting resistor R630. Disposed in the plate circuit of V605A may be a transformer T601 and plate load R629 and the decoupling capacitor C619. As stated, resistor R626 provides for a sawtooth frequency adjustment and charging resistor R628 may be also provided. Disposed between the tertiary c of transformer T601 and ground may be capacitor C617 to provide the charging time constant which determines the repetition rate of the blocking oscillator. The output of blocking oscillator V605A may be applied from the secondary b of transformer T601 to the control grid of triode V606A. Substantially unilateral current flow device V606A may be a cathode follower having a voltage divider comprising capacitors C622 and C624 disposed between its cathode and ground. Coupling capacitor C630 couples the sawtooth output to the following stages. Resistors R631 and R632 comprise a voltage divider to fix the potential applied to the grid of stage V606A. Capacitor C620 provides a bypass for the voltage divider to filter out unwanted ripple from the power supply. Capacitor C620 also serves to provide a low A.-C. impedance to return one end of the secondary winding of T601 to ground. A plate load resistor R634 is provided in the plate circuit of stage V606A and capacitor C621 provides decoupling to ground. One output of stage V606A is applied to the plate of stage V605B. A voltage divider comprising resistors R635, R637, R638 and R642 provides the necessary D.-C. potentials to be applied to the screen grid of stage V605B from the tap on resistor R637 and to the cathode of stage V605B from the junction point of resistors R638 and R642. The D.-C. error voltage for the frequency controller is applied to the control grid of stage V605B when the selector switch S2 is in AFC position. When the selector switch S2 is in manual position, the control grid of stage V605B is returned directly to the ground reference potential. Additional output taken from the junction of capacitors C622 and C624 may be coupled through coupling capacitor C630 to the grid of stage V606B. Resistor R640 may serve as a grid leak resistor for stage V606B. Resistor R639 may serve as a cathode resistor for stage V606B. An inductor L604 is connected to the plate of stage V606B to provide an inductive kick as will be explained and resistor R643 serves as a damping resistor on inductor L604. The screen supply of stage V606B may be provided through a decoupling resistor R641 and a bypass capacitor C675. The output of stage V606B may be coupled through coupling capacitor C626 to a pair of diodes V607A and V607B arranged to rectify the output and to thence couple the output to a filter which may consist of capacitor C628, resistor R644 and capacitor C629 to provide the D.-C. output voltage to be used to control the repeller plate. The output of coupling capacitor C626 may be applied to the cathode of diode V607B and the anode of diode V607A. The cathode of diode V607A may be connected to ground and the anode of diode V607B is fed to the input of the filter consisting of resistor R644 and capacitors C628 and C629. A diode V608A which serves as a D.-C. restorer or setter may be connected with its cathode tied to the output of the filter at the junction of resistor R644 and capacitor C629 and in turn the anode of D.-C. restorer V608A may be electrically connected to the V603 klystron repeller. A bleeder resistor R647 which may be connected across diode V608A may provide a D.-C. return through a resistor R646 back to the ground reference potential.

Operation of the circuit to provide required repeller voltage to set the frequency of the klystron repeller for proper output in response to D.-C. error voltage from the AFC discriminator is as follows:

Referring more particularly to Figure 2 of the drawings, wherein is shown a schematic diagram of the illustrative embodiment of the inventive AFC circuit, V605A is a blocking oscillator, the repetition rate of which is controlled by rheostat R626 providing adjustable resistance in conjunction with the magnitude of capacitor C617. The output waveform from blocking oscillator V605A is fed to the grid of tube V606A through the secondary of blocking oscillator transformer T601 which in turn is set to a D.-C. potential established by the resistance voltage divider consisting of resistors R631 and R632. The purpose of this divider is to establish the grid bias potential to tube V606A in order that half of vacuum tube, V606A and the subsequent discharge half of vacuum tube, V605B may operate in the proper region of their characteristics. As previously set forth tube V606A serves as a cathode follower which charges capacitors C622 and C624 to the potential of the driving pulse from the blocking oscillator V605A. The sharp pulse output of the blocking oscillator V605A lowers the impedance of stage V606A and causes current to flow from the plate circuit of tube V605B to charge the capacitors in the cathode of oscillator V606A. During the interval between the pulses the cathode of tube V606A remains positive and hence the grid of tube V606A causes current cut-off of that tube and no further current flows during this interval. Stage V605B serves as a pentode discharge device which is adjusted to provide a constant current discharge determined by the value of its applied control grid and screen potentials. The screen grid controller R637 sets the screen of stage V605B to provide a desired rate of current flow in tube V605B. The error voltage from the discriminator when fed to the control grid of tube V605B will establish the rate of current flow in tube V605B and hence establish the discharge rate for capacitor C622. Since the repetition rate of the sawtooth waveform is determined by the repetition rate of the blocking oscillator V605A, the slope and hence the amplitude of the sawtooth waveform is determined by the bias on the control grid and setting on the screen grid of tube V605B. The screen grid potentiometer R637 thus serves as a device which can be used to adjust the klystron repeller voltage, and the control grid of stage V605B serves to provide the AFC function as will be explained in greater detail.

Thus, for example, the setting of resistor R637 can be adjusted to provide a given center operating potential for the klystron repeller. Since a D.-C. error voltage applied to the control grid of stage V605B will change the grid current flow in stage V605B, this, in turn, will vary the amplitude of the sawtooth waveform as coupled from capacitor C630 to the control grid of tube V606B. For example, let us assume the case where the D.-C. error voltage indicates that the klystron repeller voltage should be increased to provide the necessary frequency correction. In this case the amplitude of the D.-C. error voltage on the grid of tube V605B would be increased in the positive direction to increase the rate of current flow of tube V605B with a subsequent increase in the sawtooth amplitude. This sawtooth is amplified by stage V606B. The amplified signal is then applied through the rectifier and filter circuit to the klystron repeller to adjust the voltage therein to increase the repeller voltage and thereby provide the desired correction. The amplitude of the sawtooth waveform coupled through capacitor C630 will therefore ultimately determine the voltage of the klystron repeller and hence the output frequency. As stated the sawtooth waveform which has its amplitude governed in accordance with the D.-C. error voltage is applied to the control grid of stage V606B to control the current flow through this tube and this current will be a function of the amplitude of the sawtooth. The output voltage from the plate of stage V606B is the result of the change in current of inductor L604. Since inductor L604 serves as an impedance in the plate circuit of stage V606B, the change in current in inductor L604 appears as an inductive kick as shown in the illustrated waveform at the plate of tube V606B. It is significant to note that the stray or distributed capacitance associated with the plate of tube V606B and inductor L604 causes the inductance to behave as a damped oscillatory circuit. Resistor R643 serves as an additional damping load resistor across the inductance L604 to cause a fast decay and thus the output waveform corresponds very much to a single pulse related to the amplitude of the sawtooth retrace as applied to the grid of tube V606B. The output waveform from stage V606B is then coupled to the diode V607A which serves as a clamping device so that any negative excursion of the tube V607A plate would charge the coupling capacitor C626 and thus produce a negative potential from the center of gravity or A.-C. axis to the positive portion or positive point on the wave. Thus stage V607A serves to clamp the waveform so that the peaks can never go positive with the respect to ground and hence the A.-C. axis or center of gravity of the wave would be negative in respect to ground. The second half of the diode V607B couples the negative going waveform to the load capacitor C628 which thus stores the energy from the peaks in capacitor C628. That is since diode V607B rectifies the waveform, the peak voltage of the wave is stored in capacitor C628. Thus by conduction of electron current through stage V607A and from the cathode of stage V607B to its anode, capacitor C628 accumulates electrons on its upper plate at a rate corresponding to the voltage output of stage V606B. The electron current is discharged by flow of electrons from capacitor C628 through resistor R644 and to ground through resistor R646 to cause a voltage to appear at the cathode of tube V608A which, in turn, will be dependent upon the average voltage developed at the plate of stage V606B. In turn, this voltage at the cathode of stage V608A will cause electron current through diode V608A and through resistor R647 to cause the negative 180 volts which is applied to the klystron repeller. Should a D.-C. error voltage signal from the discriminator caused by operation off-frequency result, the voltage output at the plate of stage V606B and hence the average negative voltage at that point will change so as to produce a deviation from the negative 180 volts applied to the klystron repeller which, in turn, will cause a change in klystron output frequency in a direction to cause restoration to desired frequency.

Referring more particularly to Figure 3 of the drawings wherein is shown an illustrative embodiment of a preferred means to determine the modulation characteristics of transmitter operation, with the switch S1 shown in Figure 1 in test sawtooth position, the voltage from the cathode of tube V606A as shown in Figure 2 is applied to coupling capacitor C627 to the input of tube V601. When the input selector switch S1 is moved to the test or down position the sawtooth generator V605 supplies a sawtooth waveform through coupling capacitor C627. The sawtooth waveform modulates the klystron oscillator providing the transmitter output voltage which in turn is demodulated by the IF amplifier V609, V610, associated with the AFC circuit and demodulated by the discriminator V621 which when fed through the monitor amplifier V613 reproduces the waveform which was applied to the video input. Thus, a sawtooth waveform applied to the input test signal is reproduced on a video monitor applied to the video output of amplifier V613 to display the modulation characteristics of the transmitter. Since each voltage level of the sawtooth corresponds to a discreet frequency of the discriminator V621, the energy coupled by the wavemeter will result in a reduction in amplitude of the sawtooth to provide an oscillatory marker pip on the sawtooth waveform. As the wavemeter is adjusted in frequency its relative position on the sawtooth will move in accordance with the change in frequency of the discriminator V621 and thus, for example, when the wavemeter is set to position X it will put a mark on the sawtooth as illustrated in Figure 3 and as the wavemeter is tuned to a second position or frequency it will provide a corresponding marker as illustrated by Y in Figure 3. Since the wavemeter is calibrated in frequency, it provides a secondary calibration to show what point on the sawtooth corresponds to a particular frequency. Thus if, for example, frequency at point X were to correspond to 25 megacycles, moving the wavemeter to a higher frequency, for example, 27 megacycles, would make a mark at point Y. The resultant would show that at this level X the output of the transmitter has a reference 25 megacycle frequency and Y corresponds to a 2 megacycle deviation from X as illustrated by this example.

Since the wavemeter is calibrated in megacycles at the IF frequency the mark displayed by the absorption wavemeter corresponds to the transmitted frequency as measured in terms of the sum of the reference local oscillator plus the IF frequency. Since the wavemeter is calibrated in terms of IF frequency, the local oscillator directly transposes the wavemeter readings to the carrier frequency.

Although in nowise to be construed as limiting the scope of the invention, the following types and values of components are illustrative representative values in a successfully operating embodiment of the invention.

| Tube: | Type |
|---|---|
| V501 | 6BK7A |
| V502 | 6AU8 |
| V503 | 6J6 |
| V601 | 6AU8 |
| V602 | 6CL6 |
| V603 | 6BM6 |
| V604 | 2C39B |
| V605 | 6AU8 |
| V606 | 6AU8 |
| V607 | 6AL5 |
| V608 | 6AL5 |
| V609 | 6CB6 |
| V610 | 6CB6 |
| V611 | 6CB6 |
| V612 | 6CB6 |
| V613 | 5687 |
| V620 | IN21C |
| V621 | 2(IN90) |
| V622 | IN21C |

Power supply: +420 v., +250 v., +285 v. reg.

| Resistors: | Value (ohms) |
|---|---|
| R626 | 250K |
| R628 | 560K |
| R629 | 20K |
| R630 | 220 |
| R631 | 100K |
| R632 | 100K |
| R634 | 30K |
| R635 | 43K |
| R637 | 10K |
| R638 | 12K |
| R639 | 56 |
| R640 | 200K |
| R641 | 47K |
| R642 | 560 |
| R643 | 100K |
| R644 | 100K |
| R646 | meg 3.5 |
| R647 | meg 5.1 |

| Capacitor: | Value |
|---|---|
| C617 | 680 μμf. (micromicrofarads). |
| C619 | .1 μf. (400 v.). |
| C620 | .22 μf. (200 v.). |
| C621 | .1 μf. (400 v.). |
| C622 | 1000 μμf. |
| C624 | 3300 μμf. (500 v.). |
| C626 | .1 μf. (400 v.). |
| C627 | 2200 μμf. |
| C628 | .1 μf. (400 v.). |
| C629 | .1 μf. (400 v.). |
| C630 | .0022 μf. |

| Inductor: | Value |
|---|---|
| L604 | 85 mh. |

Thereby, there is provided an AFC circuit capable of instantaneously and accurately controlling the voltage of a klystron repeller to maintain the klystron frequency at a desired constant with instantaneous correction of off-frequency excursions and which circuit will simultaneously perform the functions of a monitoring circuit and provide a means for determining that the apparatus is at desired operating frequency and desired modulating frequencies.

While particular embodiments of the invention have been shown and described, it should be understood that the invention is not limited thereto and it is intended in the appended claims to claim all such variations as fall in the true spirit of the present invention.

What we claim as new and desire to secure by Letters Patent of the United States is:

1. In an A.-C. voltage generating device, automatic frequency control means comprising a source of reference frequency A.-C. voltage, a mixer to heterodyne the A.-C. generated voltage and the reference voltage, discriminating means to provide an error signal representative of off-desired-frequency condition of said voltage generating device, a frequency control A.-C. voltage generator to provide an output waveform, means to conform the amplitude of said output waveform in accordance with said error signal, means to restore the frequency of said A.-C. voltage generating device to desired frequency in accordance with the amplitude of said output waveform and means to provide video monitoring of the output of said voltage generating device, said last-named means comprising a video amplifier, said frequency control A.-C. voltage constituting an approximately sawtooth voltage waveform, test means to feed a sample of said last-named test voltage into said video amplifier, the A.-C. voltage generating device being frequency modulated by the output of said video amplifier, and a discriminator responsive to said A.-C. voltage generating device to provide a signal for visual display of said modulation to enable taking a calibration.

2. The apparatus of claim 1 including means for providing a input video signal, means for comparing said test sawtooth to said input video signal, means to provide an adjustable indicating mark positioned on said sawtooth waveform in accordance with upper and lower permissible modulation frequency to thereby provide an indication of output modulation by virtue of the spread between indicating marks on said sawtooth, each of which indicating marks can correspond to the limits of a band of frequency swing within which it is desired to modulate the A.-C. generating means.

3. Means for sensitive automatic frequency control of a modulated carrier waveform generator comprising means responsive to off-frequency condition of said modulated carrier waveform generator to provide an error signal corresponding in magnitude and direction to the error in frequency of the modulated carrier waveform generator, means for generating a stabile pulse at fixed time intervals, means for deriving a waveform from said stabile pulse, and means for modifying said waveform derived from said stabile pulse in accordance with said error signal to vary frequency determining voltages of said modulation waveform generator in magnitude and direction to restore on-frequency condition, means responsive to said generator for generating a stabile pulse at fixed time intervals to provide for indication of modulation bandwidth, and additional means responsive to said stabile pulse at fixed time intervals to provide a visual monitoring display of output of the modulated waveform generating means.

4. In a transmitter providing means for producing electromagnetic radiations of carrier frequency and modulation of said frequency in response to video input, an automatic frequency control apparatus to provide for carrier output at predetermined carrier frequency and for a predetermined spread of modulation deviation, a mixer stage, a local oscillator unit, sampled output of said means for producing electromagnetic carrier and modulation radiations being combined with said local oscillator output in said mixer to provide an intermediate frequency output, an intermediate frequency amplifier and limiter, means to provide demodulated wave intermediate frequency energy, a discriminator responsive to the output of said intermediate frequency limiter to provide a pair of signals, representing a D.-C. error signal in accordance with the actual frequency of said electromagnetic radiation means and an A.-C. error signal in accordance with a desired visual monitoring signal respectively, a sawtooth generator device to provide a sawtooth wave, the amplitude of which wave is controlled by said discriminator D.-C. error signal output, and rectifier means responsive to the amplitude controlled output of the sawtooth generator to provide a voltage of character so as to provide for frequency correction of said electromagnetic radiations and thereby provide correct predetermined on-frequency condition of said transmitter.

5. The apparatus of claim 4 including a video amplifier to amplify the A.-C. output of the discriminator and transform said output to a low output impedance to provide a source of video monitoring of the transmitted signal, said video amplifier serving to reproduce modulation applied to the transmitter and means to recover the modulation voltage from the video monitor amplifier to provide for determining the modulation characteristics of the transmitter.

6. The apparatus of claim 5 including a wavemeter applied to the discriminator to provide a mark on the observed output of the video monitor amplifier, said mark constituting a wave trap mark visually observable as a discontinuity in a sawtooth waveform, means to supply a sample of the sawtooth wave from the sawtooth generator output to utilize for a test signal and means to apply said waveform from the sawtooth generator into the electromagnetic wave radiating means to thereby provide a sawtooth waveform obtainable in marked form from the discriminator for visual monitor test observance.

7. In a transmitter comprising klystron means to generate a carrier frequency and means to modulate said carrier frequency in accordance with video input, means to maintain on-predetermined frequency-condition and means to determine the modulation spread about said carrier frequency, said means comprising a mixer, means to sample the output of said transmitter and means to generate a reference output to be mixed in the mixer with said sampling output to provide an intermediate frequency output, discriminator means responsive to said intermediate frequency output to provide an error signal having an A.-C. and having a D.-C. component, a sawtooth generator, the output of said sawtooth generator being responsive to the D.-C. error component output of said discriminator to determine the amplitude of said generator output in accordance with said D.-C. error signals, and means to provide voltage for the repeller of the klystron in accordance with the amplitude of the sawtooth generator which had been determined by the error signal of the discriminator, said error signal in turn being varied in magnitude in accordance with the off-frequency condition of said transmitter.

8. The apparatus of claim 7 including a video monitor amplifier responsive to the A.-C. component output of said discriminator to provide for a visual monitoring signal.

9. The apparatus of claim 8 including test means to introduce a portion of the sawtooth generator output to the transmitter to thereby provide a discriminator A.-C. component output consisting of the sawtooth output of said sawtooth generator to provide visual indication thereof, a wavemeter to introduce a notch on said sawtooth waveform output in accordance with a first frequency and in accordance with a second frequency, wherein said first and second frequencies can determine the outer predetermined permissible modulations of the carrier output of said transmitter.

10. In a transmitter, a klystron to provide a carrier frequency in accordance with voltage supplied to its repeller plate, means to modulate said carrier frequency in accordance with frequency deviations representing video signals, a local oscillator, means to heterodyne a sampled output of said klystron oscillator with said local oscillator to provide an intermediate frequency representative of the klystron frequency, means to remove the modulation from said intermediate frequency, means to provide a D.-C. reference error signal in accordance with the instantaneous klystron output frequency, means responsive to said error signal producing means to regulate the voltage supplied to the repeller of said klystron and thereby regulate the carrier frequency output of the klystron, means to provide a visual indication of sawtooth output in a test position, means to provide a marker on said visual indication in accordance with a first and a second limit of modulation frequency on said klystron carrier, said sawtooth being fed from said discriminator in test condition to said visual indicating means.

11. A multi-functional method of determining carrier frequency and the outer limits of permissible modulation within very close accuracy said method comprising generating a carrier frequency output, generating modulation to modulate said carrier frequency, generating a reference frequency, heterodyning said modulated carrier with said reference frequency to provide an intermediate frequency, providing for elimination of modulation on said intermediate frequency, generating a D.-C. error signal in accordance with said carrier frequency, generating a sawtooth voltage, governing the amplitude and slope of said sawtooth voltage in accordance with said D.-C. error signal, amplifying and rectifying said governed sawtooth voltage, controlling the carrier output frequency in accordance with the rectified output of said governed sawtooth voltage, introducing said sawtooth voltage into said carrier frequency waveform, providing an A.-C. voltage in accordance with the modulation deviation as measured by said sawtooth output, providing indications on said sawtooth waveform of limits of modulation permissible, and providing visual monitoring of the output of the permissible limits of modulation to thereby determine an on-frequency condition and if modulation is within desired limits.

12. Means to provide for on-frequency condition of a transmitter and for modulation within predetermined limits, said means comprising a video amplifier responsive to video input signals, a klystron including a klystron repeller to generate carrier frequency and modulated in accordance with the amplified output of the video amplifier, electromagnetic output radiation means, a combined power amplifier also acting as a buffer disposed between said radiation output means and said klystron, a local oscillator circuit to generate a reference frequency signal, a mixer to heterodyne a sample of the output of said electromagnetic radiation means and said reference signal to provide an intermediate frequency comprising a difference frequency between the reference local oscillator signal and the output of the buffer, an IF amplifier circuit to amplify the intermediate frequency output of the heterodyning means, a limiter circuit to provide an amplified intermediate frequency voltage free of amplitude modulation, a discriminator responsive to the output of said limiter to generate an error voltage, said discriminator being adjusted to provide for zero output in the presence of an intermediate frequency showing a carrier wave on-frequency, deviation from the IF frequency in accordance with off-frequency carrier output causing a D.-C. error voltage output from the discriminator, means to generate a sawtooth voltage, means to limit the amplitude of said sawtooth voltage in accordance with said error voltage from said discriminator, D.-C. amplifying means to amplify the output of said sawtooth voltage generating means, rectifier means to rectify the output of said D.-C. amplifier, and D.-C. setter means responsive to the output of said last-named rectifier to provide operating voltage for the repeller plate of said klystron in accordance with desired frequency output, and means responsive to a second output of said discriminator to provide a video monitoring indication.

13. In apparatus including a klystron for providing a carrier frequency within close tolerances and a visual monitoring indication of said signal and a visual indication in test condition of limits of modulation on said carrier frequency, automatic frequency control apparatus to modify the output voltage of said apparatus to keep it in constant on-frequency condition, said automatic frequency control system comprising a sawtooth generator including a first blocking oscillator circuit to generate sharp pulses at a constant frequency, a cathode follower responsive to said sharp pulses, to produce a reverse sawtooth waveform, an amplifier to amplify said reverse sawtooth waveform, said sawtooth generator including a capacitor to provide a sawtooth voltage by discharge of said capacitor, means to provide a D.-C. error voltage in accordance with frequency deviation from desired frequency of the transmitter, said sawtooth generator including means to control the amplitude of the sawtooth in accordance with the D.-C. error voltage, an amplifier to amplify said controlled sawtooth voltage, a rectifier responsive to the output of said last-named amplifier to provide a voltage to modify the carrier frequency of the klystron in accordance with desired frequency, and a D.-C. restorer responsive to the output of the said rectifier to clamp applied video voltage at a peak of the synchronizing waveform of the transmitter signal, the output of said D.-C. restorer clamping the voltage determining the carrier frequency so as always to swing from one direction and thereby cause the klystron output frequency to be modulated in accordance with applied potential so as to deviate in only one direction from this clamping point.

14. The apparatus of claim 13 including a discriminator responsive to deviations from carrier frequency of said transmitter, said discriminator providing said D.-C. output representative of error in carrier frequency and simultaneously providing a second output, a video amplifier having a low output impedance to provide a source of video monitoring of the transmitter signal, a wavemeter applied to said discriminator to provide a mark on the observed output of the video monitor amplifier, means to supply a test signal sawtooth waveform for said video monitor amplifier, said means comprising means to take a second output from the sawtooth generator to supply a test signal into the carrier apparatus of the transmitter.

15. An automatic frequency control apparatus for restoring the frequency of an A.-C. generating device including a klystron oscillator having a repeller plate and for providing a test waveform in accordance with modulation characteristics of the modulating waveform applied to said generated waveform, said device comprising a blocking oscillator used to generate a series of sharp pulses at a constant frequency, said blocking oscillator including a regenerative amplifier circuit comprising a transformer having a primary, a secondary and a tertiary and an adjustable RC time constant device in its grid circuit comprising a discharge capacitor, a first charging resistor and a second adustable charging resistor to provide desired blocking rate for the oscillator, a cathode follower responsive to the output of the secondary of the transformer of said blocking oscillator, a capacitor voltage divider disposed between the cathode of the cathode follower and ground, a coupling capacitor to couple the output of the cathode follower to following stages, a resistance voltage divider to fix the potential applied to the grid of the cathode follower, a coupling capacitor coupled to the cathode of the cathode follower to provide a sawtooth output for test of modulation characteristics of the A.-C. generator output, an electron discharge device having its plate directly tied to the cathode of the cathode follower, a bleeder including an adjustable device to provide screen centering voltage for said electron discharge device, means to provide a D.-C. error voltage in accordance with off-frequency condition of said transmitter to the control grid of said electron discharge device, said output coupling capacitor coupling output from a point between the first and second capacitors in the cathode voltage divider circuit of the cathode follower, a direct coupled amplifier responsive to the output of said electron discharge device taken from the mid point between the cathode follower cathode capacitive voltage divider to provide an amplified oscillatory output in accordance with D.-C. error voltage applied to said electron discharge device, an inductor in the plate of said D.-C. amplifier and damping means disposed across said inductor to provide a rapidly dampened oscillatory kick to thereby provide essentially a single sharp voltage in accordance with said D.-C. error voltage, a D.-C. restorer connected to the output of said D.-C. amplifier to provide clamping so that any negative excursion of the output of the D.-C. amplifier would produce a negative potential from the center of gravity to the positive portion that is the positive point on the wave so as to clamp the waveform so that the peaks can never go positive with respect to ground and to hence supply a negative A.-C. axis for the output of the the D.-C. amplifier, a second diode to couple the negative going waveform, a load capacitor coupled by the second diode to thereby store the energy from the peak of the capacitor storage voltage and a third diode comprising a D.-C. setter to set the voltage at the klystron repeller plate.

16. An automatic frequency control circuit for a modulated carrier frequency generator, said circuit comprising means to provide a D.-C. error voltage in accordance with off-center frequency of the carrier wave, a pulse generator to provide a series of sharp pulses at constant frequency, a cathode follower responsive to the pulse output of said pulse generator, said cathode follower including a cathode having an output capacitive voltage divider comprising a first capacitor disposed between said cathode and a second capacitor said second capacitor being disposed between said first capacitor and ground, output means connected to said cathode to couple output of the cathode waveform to said modulated carrier frequency generator, a pentode having a control grid and a screen grid, adjustable means connected to said screen grid to determine center frequency of said modulated carrier generator in on-frequency condition, means to apply said D.-C. error voltage to the control grid of said pentode, said pentode having an anode directly coupled to the cathode of said cathode follower to thereby provide a discharge path for the capacitors in the capacitive voltage divider in the cathode of the cathode follower, thereby providing a reverse sawtooth waveform at the junction between the first and second capacitors and at the cathode of said cathode follower, an amplifier to amplify said reverse sawtooth waveform, said amplifier including an inductor disposed in its plate circuit and damping means associated with said inductor to provide a damped oscillatory kick to produce damped oscillations from said sawtooth waveform in accordance with the slope and amplitude of said sawtooth waveform, means to rectify said damped oscillatory output to provide a D.-C. voltage of amount to control said modulated carrier frequency generator to provide correct on-frequency condition, visual display producing means coupled to the cathode of said cathode follower which thereby provides a reference sawtooth waveform, means associated with said pulse generator to apply a test reference modulation voltage to said carrier frequency generator and producing said D.-C. error voltage to control said pentode and simultaneously producing an A.-C. component fed to said visual display producing means, and means to produce a marker for said visual producing means output in accordance with desired modulation limits of the modulation imposed on said carrier frequency.

17. The apparatus of claim 16, said marker producing apparatus including a wavemeter so that thereby when in test condition of said carrier frequency generator, said sawtooth generator supplies a sawtooth waveform through said output coupling capacitor from the cathode follower to modulate the carrier frequency generating means and provide an output voltage, means to demodulate said output voltage, said output voltage being further demodulated by said discriminator, said visual indication producing means thereby reproducing said sawtooth waveform, to cause display of the modulating characteristics of the modulated carrier frequency generating device, each voltage level of the sawtooth corresponding to a discrete frequency of the discriminator, the wavemeter coupling energy into the discriminator, the coupled energy from the wavemeter thereby causing a reduction in amplitude of the sawtooth waveform at a wavemeter frequency corresponding point to produce an oscillatory marker pip on the sawtooth waveform, said wavemeter being adjustable in frequency to provide a moveable oscillatory marker pip, said wavemeter being calibrated in frequency to provide a secondary calibration to show what point on the sawtooth corresponds to a given frequency, the visual indicating device thereby being calibrated in frequency to enable comparison of an input signal to said carrier generator with test mark points to describe the amount of frequency deviation of modulation, said wavemeter being of the absorption type and capable of thereby measuring the amount of modulation so that the transmitted input modulation signal may be adjusted to provide the same amplitude as the limits governed by the sawtooth test signal to thus provide an indication of output modulation which will correspond to the spread between oscillatory pips provided as a reference point on the sawtooth to thus correspond to a permitted band of frequency swing within which it is desired to modulate the generated modulated carrier frequency wave.

18. A method of supplying repeller voltage to a klystron oscillator to cause a predetermined frequency to be emitted by the oscillator and to simultaneously provide for modulation limits of said frequency, said method comprising generating an A.-C. voltage, comparing the oscillator output frequency with a reference frequency, producing a D.-C. error voltage in accordance with said comparison, controlling the amplitude of the A.-C. voltage by the D.-C. error voltage, amplifying the A.-C. voltage which has been controlled by the D.-C. error voltage, rectifying the amplified last-named A.-C. voltage and using the rectified voltage to supply the repeller voltage for the klystron repeller plate to thereby provide a stabile circuit affected if at all to a minimum degree by variations in component characteristics, and utilizing the first-mentioned A.-C. voltage to generate an output sawtooth test signal, said method including a method of measuring and calibrating the degree of frequency modulation of the klystron oscillator, said last-named method comprising applying the sawtooth generated from said automatic frequency control A.-C. voltage to a video amplifier, displaying the modulation of the klystron to enable a calibration thereof, said A.-C. voltage comprising a sawtooth waveform, comparing the sawtooth waveform to an input video signal to describe the amount of deviation in frequency measuring the amount of modulation, providing a notch in the sawtooth waveform as displayed on the output of a video monitor to denote known frequency, and adjusting the transmitted video signal to provide the same amplitude when viewed on the display device as the previously established limits by a sawtooth test signal to thus provide proper output modulation of the klystron because the spread between notches as reference points will correspond to a permitted band of frequency swing within which it is desired to modulate the transmitter carrier wave.

References Cited in the file of this patent

UNITED STATES PATENTS

| | | |
|---|---|---|
| 2,499,755 | Hunt | Mar. 7, 1950 |
| 2,541,066 | Jaynes | Feb. 13, 1951 |
| 2,548,635 | Summerhayes | Apr. 10, 1951 |
| 2,648,007 | Witowski | Aug. 4, 1953 |
| 2,695,358 | Bush | Nov. 23, 1954 |
| 2,726,367 | Moore | Dec. 6, 1955 |
| 2,782,374 | Leck | Feb. 19, 1957 |
| 2,806,137 | Myers | Sept. 10, 1957 |

UNITED STATES PATENT OFFICE
CERTIFICATE OF CORRECTION

Patent No. 2,949,584                            August 16, 1960

Thomas G. Custin et al.

It is hereby certified that error appears in the printed specification of the above numbered patent requiring correction and that the said Letters Patent should read as corrected below.

Column 12, line 53, for "A.-C. generating" read -- A.-C. wave generating --; line 64, for "adustable" read -- adjustable --.

Signed and sealed this 31st day of January 1961.

(SEAL)
Attest:

KARL H. AXLINE                                ROBERT C. WATSON
Attesting Officer                              Commissioner of Patents